United States Patent [19]

James

[11] 4,115,263
[45] Sep. 19, 1978

[54] PERIODIC CHLORINATION AND SUPERCHLORINATION OF RECIRCULATING SWIMMING POOL WATER

[75] Inventor: Robert Frederic James, Thornhill, Canada

[73] Assignee: Auto-Chlor Inc., Mississauga, Canada

[21] Appl. No.: 734,350

[22] Filed: Oct. 20, 1976

[51] Int. Cl.² .................. B01D 11/02; C01B 3/06
[52] U.S. Cl. .................................. 210/60; 210/62; 210/169; 210/61; 422/281
[58] Field of Search .......... 210/169, 61, 62, 60; 23/267 E, 272.7, 272.8, 267 C

[56] References Cited

U.S. PATENT DOCUMENTS

| | | | |
|---|---|---|---|
| 2,820,701 | 1/1958 | Leslie | 210/169 |
| 3,170,883 | 2/1965 | Owen | 210/169 |
| 3,368,683 | 2/1968 | Rak | 210/169 |
| 3,412,021 | 11/1968 | Paterson | 210/169 |
| 3,684,460 | 8/1972 | Arneson | 210/169 |
| 3,760,947 | 9/1973 | Morrison | 210/169 |
| 3,763,878 | 10/1973 | Harden | 210/169 |
| 3,804,253 | 4/1974 | Wellman | 210/169 |
| 3,867,290 | 2/1975 | Mackey | 210/169 |
| 3,912,627 | 10/1975 | Tepas | 210/169 |
| 4,016,079 | 4/1977 | Severin | 210/169 |
| 4,033,871 | 7/1977 | Wall | 210/169 |

Primary Examiner—Stephen J. Emery
Attorney, Agent, or Firm—Weldon F. Green

[57] ABSTRACT

An improvement in a method for maintaining swimming pool water fit for use and apparatus for implementing same that is cyclical and that requires minimal amounts of treatment chemical, such method including introducing into such body of water an amount of selected accepted inhibiting chemical sufficient to raise the concentration of such chemical to a value within an established range known to destroy or inhibit the growth of any contaminant, then recirculating such body of water until the concentration of such chemical diminishes to a low point; then repeating the introduction step and the recirculation step several times with the cycle completed by the introduction of an amount of the order of twice the amount of the treatment chemical introduced at each preceding introduction step so as to dramatically change or shock the pool environment followed by recirculating such body of water until the concentration diminishes to a low point and then repeating the cycle; the apparatus for dispensing the treatment chemical includes a digital clock with a decoder and output timing network and days counting circuitry for implementing the aforementioned method steps including a second timer actuatable during the cycle for delivering the double measured amount in the final introduction step of such cycle.

4 Claims, 3 Drawing Figures

PERIODIC CHLORINATION AND SUPERCHLORINATION OF RECIRCULATING SWIMMING POOL WATER

FIELD OF INVENTION

This invention relates to improvements in a method for maintaining water, such as swimming pool water, fit for use over a wide range of indoor and outdoor conditions normally encountered in the operation of such facility and also relates to equipment and circuitry therefore for automatically implementing and controlling the sequential steps of such improved method, if desired.

BACKGROUND TO THE INVENTION

It is probable in most swimming pool facilities that the swimming pool water is recirculated by a motor driven pump so that the pool water can be continuously filtered and in addition pass through a suitable heater so as to maintain the water substantially free of debris and at a selected temperature.

Swimming pool water can be kept substantially free from bacteria, viruses and algae by the addition of certain selected chemical compounds, for example by introducing liquid or gaseous chlorine or sodium hypochlorite or calcium hypochlorite either in its crystalline form or in solution in a quantity sufficient under given conditions to yield a level of free chlorine which will at least inhibit the growth of or destroy those contaminants.

If free chlorine is present in an amount of approximately 1.5 parts per million in water maintained at a temperature of the order of 80° fahrenheit and of a pH of approximately 7.6 to 7.8 then optimum conditions prevail in which bacteria, viruses and algae likely will be destroyed or their growth severely inhibited.

The required amount of selected chemicals to provide adequate free chlorine concentration will increase with temperature. Also such amount will be affected by the character of the pool water itself, for example its degree of hardness and whether the pool is subjected to heavy or light use.

In some cases higher levels of free chlorine may be warranted as a precautionary measure especially where the pool is under heavy use or where alage growth flourishes. In some jurisdictions regulations governing the operation of public or commercial pools prescribe higher levels of available free chlorine than would normally be necessary.

The selected chemical additives can be introduced on the pressure side of the associated pumping system in installations where pool water is recirculated. Natural forces of diffusion and convection also work under recirculation to the end that substantially uniform distribution of the chemical additive is achieved in a relatively short interval of time after introduction.

The pH of pool water is also subject to variation depending in part upon the character of the water itself. It has become common practice to control the pH by the introduction of still other chemicals to establish the aforementioned range of 7.6 to 7.8 approximately, which chemicals will also be disseminated throughout the pool by the recirculation pump and associated natural forces. The pH range so established by known methods tends to minimize the effect of the combined chlorine or chloramines which in certain concentrations irritate human tissue.

Following introduction and distribution of the inhibiting and controlling chemicals, their effective concentrations diminish or shift through reactions with contaminants by decomposition and also through exposure to sunlight. Consequently, original levels must be restored from time to time by the addition of still more additives.

Procedures and schedules have been developed to properly test pool water at intervals for free chlorine concentration and to determine the pH with the additives then weighed out in sufficient quantity and physically introduced at specified points at the pool periphery.

In other cases the chemical additives are introduced in solution of known strength supplied by commercial sources with the requisite volumes of liquids added to the pool water at specified points at the pool periphery or through an appropriate conduit leading to the pressure side of the recirculation pump discharging the water back into the pool.

Procedures involving the testing of pool water for determining free chlorine concentration and pH followed by the addition of measured quantities of the inhibiting and controlling chemicals calculated upon specific test results taken before the addition may shift those concentrations in pool water beyond acceptable limits for either comfort or safety and even cause conditions which tend to support the growth of the contaminants rather than suppress them.

With this invention the degree of control over the variables encountered with such recirculated pool water is substantially increased yielding a body of water fit for use at all stages of the application of the method.

OBJECTS OF THE INVENTION

The principal object of this invention is to maintain a recirculated body of water particularly swimming pool water, substantially clear and free from bacteria, viruses and algae over an extended period of time and fit for the use intended through the adoption of a novel series of scheduled chemical treatments without resort to the usual practice of scheduled testing followed by a calculation and introduction of the amount of chemical additives required and wherein only minimal amounts of the selected chemical are introduced.

It is also an important object to provide a method that can be adapted to recirculate swimming pool water installations over a range of pool sizes and under a variety of conditions including those dictated by regulations and whether the pool be private, public or commercial.

Still another very important object is to provide an improved method which is susceptible of implementation and control through automated equipment for the most part in order to relieve the pool owner, or pool operator from the demands of constant supervision.

Still another very important object resides in providing equipment control devices and circuitry which are compact dependable and adaptable to pool installations over a wide range and all at reasonable cost.

FEATURES OF THE INVENTION

The principal feature of this invention resides in providing a cyclical method for maintaining a recirculated body of water, such as swimming pool water, substantially clear and free from contaminants, such as bacteria, viruses or algae, each succeeding cycle of such method including the step of introducing into such body of water an amount of selected accepted inhibiting chemical sufficient to raise the concentration of such chemical to a value within an established range known to destroy or inhibit the growth of the contaminants, then recirculating such body of water until the concentration of such chemical diminishes to a point approaching the lower limit within the established range and then repeating each introduction step and recirculation step aforementioned sequentially several times; then introducing into such body of water an amount of such chemical sufficient to raise its concentration substantially above the first selected value within the established range, then recirculating such body of water until the concentration diminishes to a point approaching the lower limit within the established range and then repeating the cycle.

More particularly it has been established that under more or less constant pool conditions as to temperature and frequency of use, the final amount introduced in each cycle if approximately double the amount first introduced, is sufficient to so alter the environment in the pool water, as to overwhelm, inhibit or destroy any contaminant that through mutation may have adapted to the more or less earlier stabilized pool conditions.

More particularly, by adopting a schedule providing for the introduction of the selected chemical additive between sundown and dawn and especially between the hours of 12 midnight and 4 a.m. under certain pool conditions, particularly private pools, this method achieves its maximum efficiency and freedom from possible irritations or harm to human tissues.

Still another feature resides in assigning each recirculation step a time interval of the order of 24 hours and providing for the treatments in a sequence which gives rise to a cycle of 7 days or 1 week's duration where that established pattern is convenient.

In the case of a private or domestic swimming pool it has been established that a high order of clarity of pool water substantially free from contaminants, can be maintained indefinitely by practising the improved cyclical method using a source of free chlorine sufficient to raise concentration of same to the level of 1.5 parts per million at the commencement of the cycle or first introduction step and adopting a time interval for recirculation of 24 hours, introducing such free chlorine yielding chemical every 24 hours, succeeded by the recirculation step carried on for 24 hours and repeating same for six days followed by the final introduction step of chemical to raise the level of free chlorine to approximately three parts per million or double the original level on the seventh day, followed by recirculation of such pool water for a further 24 hour interval. The cycle is then repeated for each succeeding week.

In the case of commercial or public pools the level of free chlorine to be established by regulation may be as high as 10 ppm with prevailing conditions requiring that the time interval for recirculation be reduced substantially. Nevertheless, by employing such cyclical method in which the pool waters charged with an increased amount of selected chemical once in each cycle the tendency for contaminants to adjust to pool environment is minimized and the goal of continued clear water free from contaminants substantially realized.

Another feature of this invention resides in effectively reducing the concentration of the combined chlorine or chloramines which irritate body tissues particularly the eyes, through limiting the introduction of free chlorine yielding chemicals to minimal quantities, by utilizing in the case of domestic pools the night hours, primarily, as the assigned interval of time for the introduction of such chemical to yield highest concentration of free chlorine and therefore to promote greatest chemical activity during the period in which the pool is not in use; to thereby permit subsidence of the activity of the free chlorine during the daylight hours of use, which together with degradation by decomposition through the action of sunlight ensures a pool environment most suitable for use.

Another feature of this invention resides in providing dispensing apparatus for automatically controlling the steps of the method that includes a manually activatable mechanism provided with calibration markings corresponding to a useful range of pool volumes from about 10,000 gallons to 50,000 gallons for residential pools and applicable to a range from 10,000 gallons to 200,000 gallons including whirlpool baths to very large commercial facilities, whereby the precise amount of treatment inhibiting chemical to be released to such pool water volume may be established with such mechanism also being adjustable for the purpose of increasing or decreasing such amount of treatment inhibiting chemical as may be dictated by an increase or decrease in the temperature of the pool water, with 80° F. serving as the mean temperature for purposes of calculating such amounts or by heavier or lighter use of such pool.

More particularly in the preferred embodiment the dispensing apparatus includes an automatic timer whose timing intervals extend to embrace at least 1 week of operation and whose cycle is reproducible, such timer being associated with and controlling the activation of switching devices which energize circuitry to dispense or release the desired amount of inhibiting treatment chemical in accordance with the program and which dispensing apparatus is also provided with controlling circuitry for controlling or energizing the motor driven pump as well as other circuitry for displaying of visual indications of the stages of the method as the cycle progresses.

Another feature resides in providing dispensing apparatus adaptable to a variety of pump operation cycles and which provides also for manual interruption or override where pool conditions would demand special considerations and the release into the pool of additional inhibiting chemical such as when a pool is under heavier use than normal.

DRAWINGS

These and other objects and features will be apparent upon reading the following description in association with the illustrations appearing in the sheets of drawings in which FIG. 1 is a frontal view of the control box with cover removed which houses the dispensing apparatus components and circuitry illustrating the visual display indicator and switching devices for implementing and controlling the cycle;

THE PREFERRED METHOD

Figure 1:
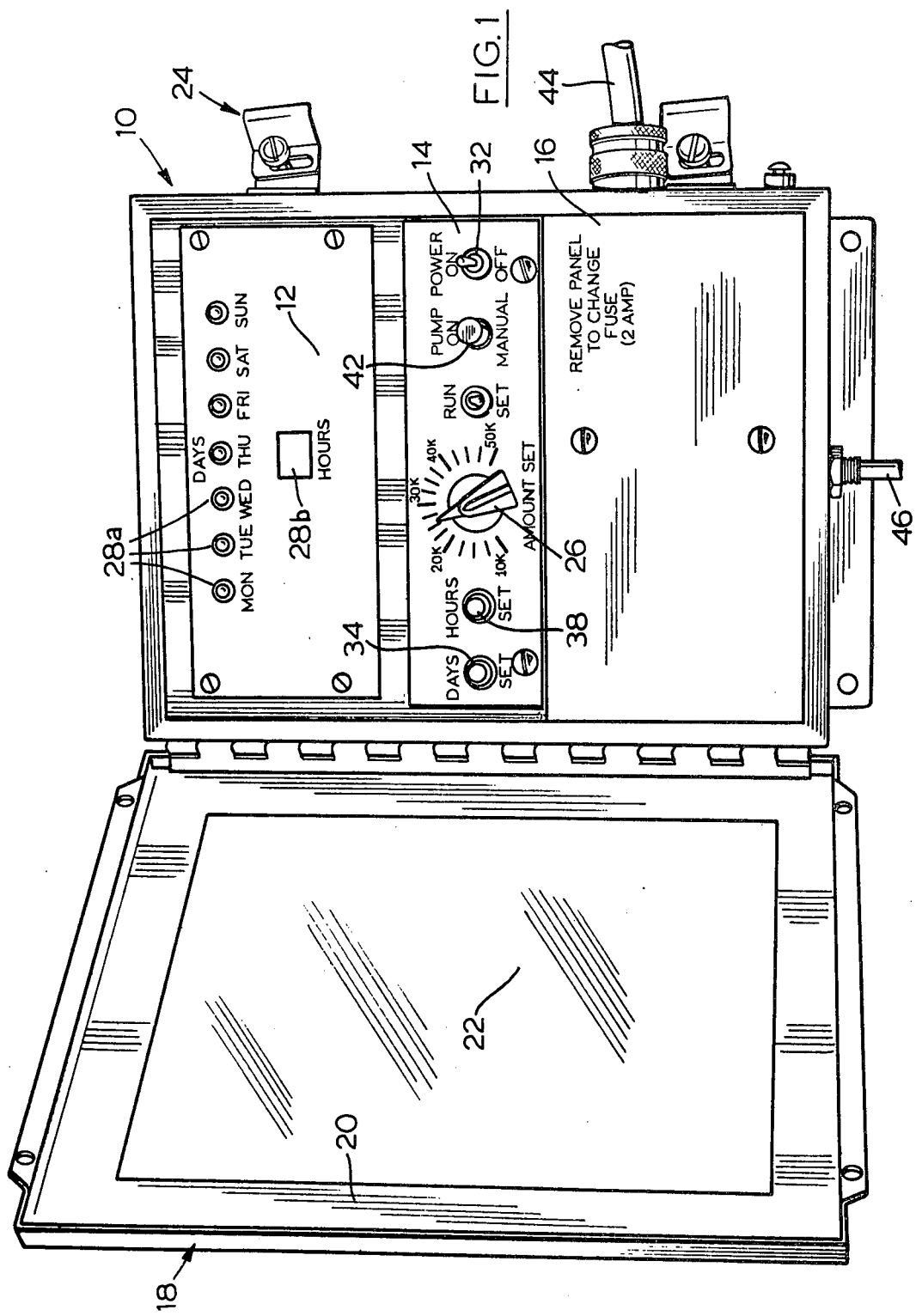

According to the preferred embodiment of this invention the novel method embraces repeated cycles having essentially the following characteristics:

A measured amount of selected accepted treatment chemical is introduced into a body of pool water of known volume which is intended to raise the concentration of free chlorine to within a known established range of effectiveness to rid the pool water of contaminants.

The pool water is recirculated so that concentration of the free chlorine is substantially constant throughout with recirculation continuing or periodically undertaken so as to maintain the pool water equilibrium for a fixed time interval, in the preferred embodiment 24 hours.

A second measured amount of treatment chemical equal to the first is introduced after the time allowed for recirculation first mentioned followed by continuous or intermittent circulation as desired which steps are then repeated several times.

Finally in the second to last step of the cycle a substantially greater amount, in the case of domestic use approximately twice the measured amount, of that introduced in each of the preceding introduction steps is added to the pool water raising the concentration of free chlorine substantially well above the first established value, which final introduction step is followed by recirculation of the pool water in the manner previously described.

The first cycle comes to an end with the end of the time interval allowed for the final recirculation step to lower the concentrate to the bottom of the range, then followed by succeeding cycle.

According to this method the free chlorine concentration will diminish over the selected time interval allowed from a high value to a low value preferably approaching 0 ppm for residential pools and 0.6 ppm for most commercial pools, which diminishing rate and hence the time interval and amounts to be added will be affected by the pool environment, namely whether the pool is indoor or outdoor, whether the time selected for introduction of the treatment chemical is in the dark hours, whether the pool is lightly used or heavily used, whether the day is bright or cloudy and also upon the character of the water itself, whether it be hard or soft. It will be understood that because of the depletion of the chlorine over the interval of time allowed for recirculation that the character of the pool water is constantly changing and towards the end of such time interval will be substantially free of the chlorine.

With the repeated introduction of the treatment chemical in the same amount, the pool water will in succession experience the decline in available free chlorine as explained.

Certain algae, possibly certain bacteria, or viruses, may accommodate themselves to such reproducible environment of the pool water and must be destroyed which is accomplished by dramatically changing the environment through the final introduction step of the cycle, involving the introduction of treatment chemical raising the free chlorine concentration to a very high level.

The time interval selected for recirculation following the final introduction of the extra dosage of the treatment chemical should be such that the concentration of the free chlorine is reduced to a level approaching 0 ppm in the case of a domestic pool and 0.6 ppm for most commercial units.

It has been established that with such a program a pool water environment will have the following characteristics:
(a) clear water
(b) even free chlorine distribution
(c) algae or plant growth maintained in a minimum
(d) the odor of chlorine and eye discomfort attributable to chloramines maintained at a minimum
(e) the cost of treating chemicals minimized and
(f) formerly requisite scheduled testing in order to calculate amount of chemical additive required eliminated.

Residential pool volumes range from below 30,000 imperial gallons to 50,000 imperial gallons for private use with commercial installations lying within the 100,000 to 200,000 gallons range. The novel method disclosed is applicable to all such facilities.

Commercial sources of chlorine are available in the form of sodium hypochlorite, for example, yielding 12% chlorine in solution. Such treatment chemical is furnished in 5 imperial gallon vessels or tanks, a convenient size for the range of pool volumes mentioned.

It has been established with the aforementioned treatment chemical that 1 fl. oz. of same is sufficient under normal circumstances to treat 1,000 imperial gallons of pool water raising the free chlorine concentration to within an established effective range of between 0.5 and 3.0 parts per million at a temperature of approximately 78° fahrenheit and in which the pH of the pool water is of the order of 7.2 to 7.8.

Accordingly for a 30,000 imperial gallon pool 30 fl.oz. of such treatment chemical would be required at each introduction step aforementioned, except for the final introduction step where 60 fl. oz. would be added to raise the free chlorine concentration to approximately double the original value.

It has also been found that in order to compensate for evaporation of chlorine as the temperature of the pool would rise above 78° fahrenheit, it is necessary to add 1 additional fluid ounce of treatment chemical for each degree fahrenheit above the base 78° fahrenheit.

In the case of a domestic or private pool it has been established that effective control over pool water can be maintained using a seven-day cycle and preferably selecting a time between 12 midnight and 4 a.m. as the time for introducing the treatment chemical.

If the automatic equipment would not be used or be available the time for introducing the treatment chemical could be advanced to 10 p.m. so as to enable the pool attendant to keep reasonable hours. Where however, suitable equipment would be available, the preferred time for introducing the treatment chemical is 2 a.m..

Hence, to illustrate in connection with a 30,000 imperial gallon pool at 78° to 80° fahrenheit, having a cycle of seven days assigned to it and choosing Monday as day 1, the first 30 fl. oz. of treatment chemical would be introduced at 2 a.m. Monday morning, followed by a 24 hour time interval for recirculation with the introduction in the same quantity undertaken on day 2, Tuesday, and throughout until day 6 Saturday, and finally at 2 a.m. Sunday morning the introduction of 60 fl. oz. of the treatment chemical followed by the 24 hour interval for recirculation.

In the case of commercial pools the time interval allowed for recirculation will be reduced. There also will be circumstances in which the method will be discontinued following the closing of the pool to bathers and reintroduced the following morning before the pool is opened. In such cases adjustment of the amount of treatment chemical may be required and as well testing of the pool water also recommended, but essentially adoption of the repeated cycle described will achieve substantial control over extended periods of time of such pool water so as to preserve it in fit condition for use.

THE PREFERRED DISPENSING EQUIPMENT AND ASSOCIATED COMPONENTS AND CIRCUITRY

FIG. 1 of the drawings reveals a typical enclosure for housing certain components of the dispensing apparatus developed to implement the novel pool water treatment method disclosed.

The enclosure includes a weather resistant casing or shell 10 which is adapted to receive and house certain components and circuitry of the dispensing apparatus whose openings are closed by an upper plate 12 provided with apertures so as to display visually the progress of the cycle with the central plate 14 provided with apertures for locating the various control switches.

The lower panel 16 is removable in order to replace the fuse, repair the components or the circuitry.

This part of the enclosure or casing is adapted to be protected not only from the weather, but from attempts to interfere with the operation of the apparatus by providing a hinged cover 18 including a frame portion 20 and transparent window 22 so that when swung to the right to overlie panels 12, 14 and 16, and locked in position through suitable clamping means as at 24 panels 12 and 16 can be readily observed so that the stages of operation can be checked at any time without dislodging the cover 20.

It is intended that all controls be enclosed within casing 10 and that preferably with cover 20 locked in place the unit is both weather and dust proof.

TREATMENT CHEMICAL REQUIREMENT

The normal requirement for a domestic swimming pool as earlier mentioned, is approximately 1 fl. oz. of the treatment chemical sodium hypochlorite solution yielding approximately 12% chlorine to be added for each 1000 Imperial gallons of water per day. Such amount is applicable to a water temperature of the order of 78° to 80° fahrenheit.

The "amount set" control indicated at 26 is a variable control allowing setting of the precise amount of treatment chemical to be dispensed each day, preferably calibrated in thousands of Imperial gallons of pool size.

Figure 2:
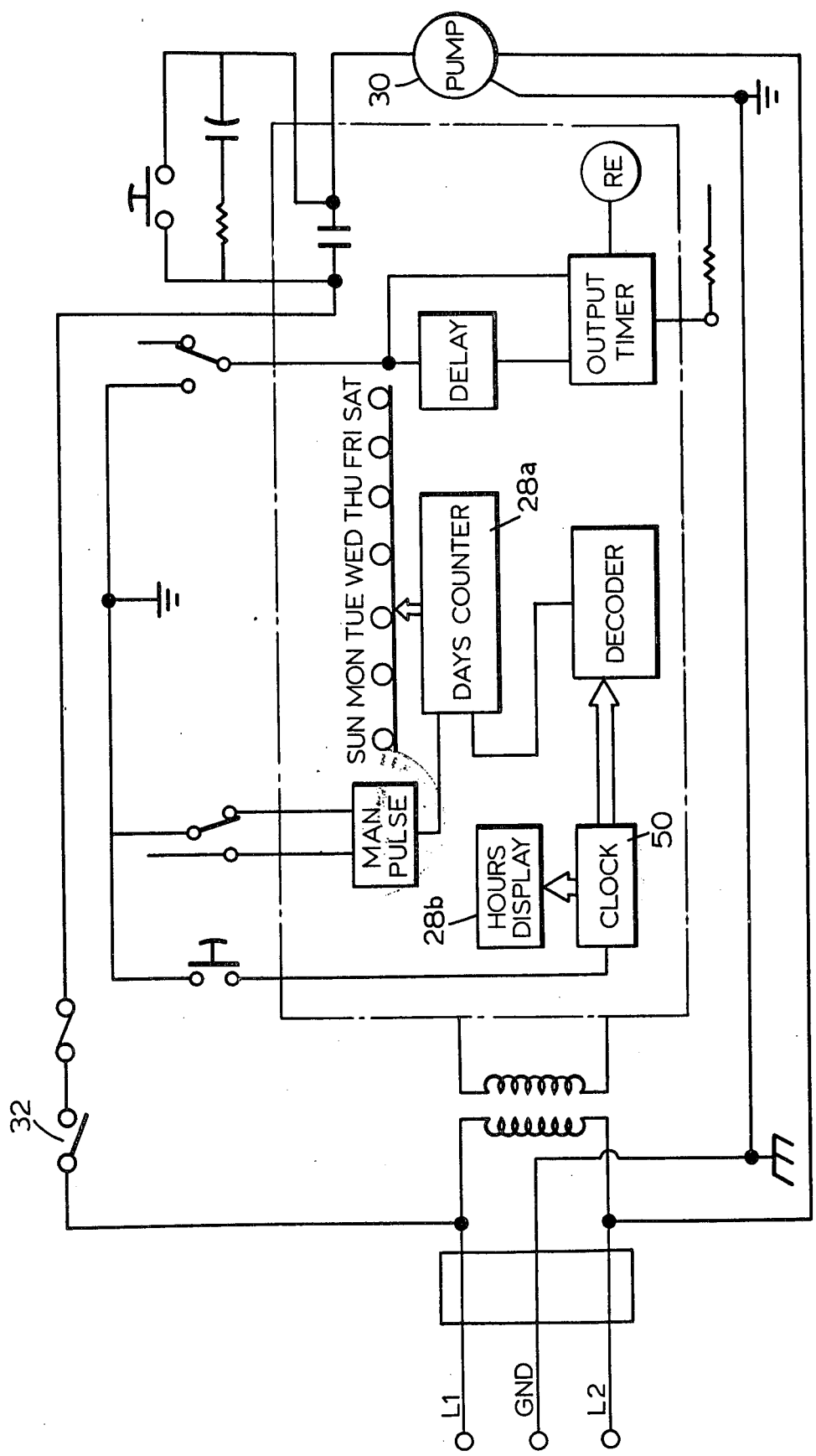
FIG. 2 is a block diagram of the dispensing apparatus circuitry.
Figure 3:
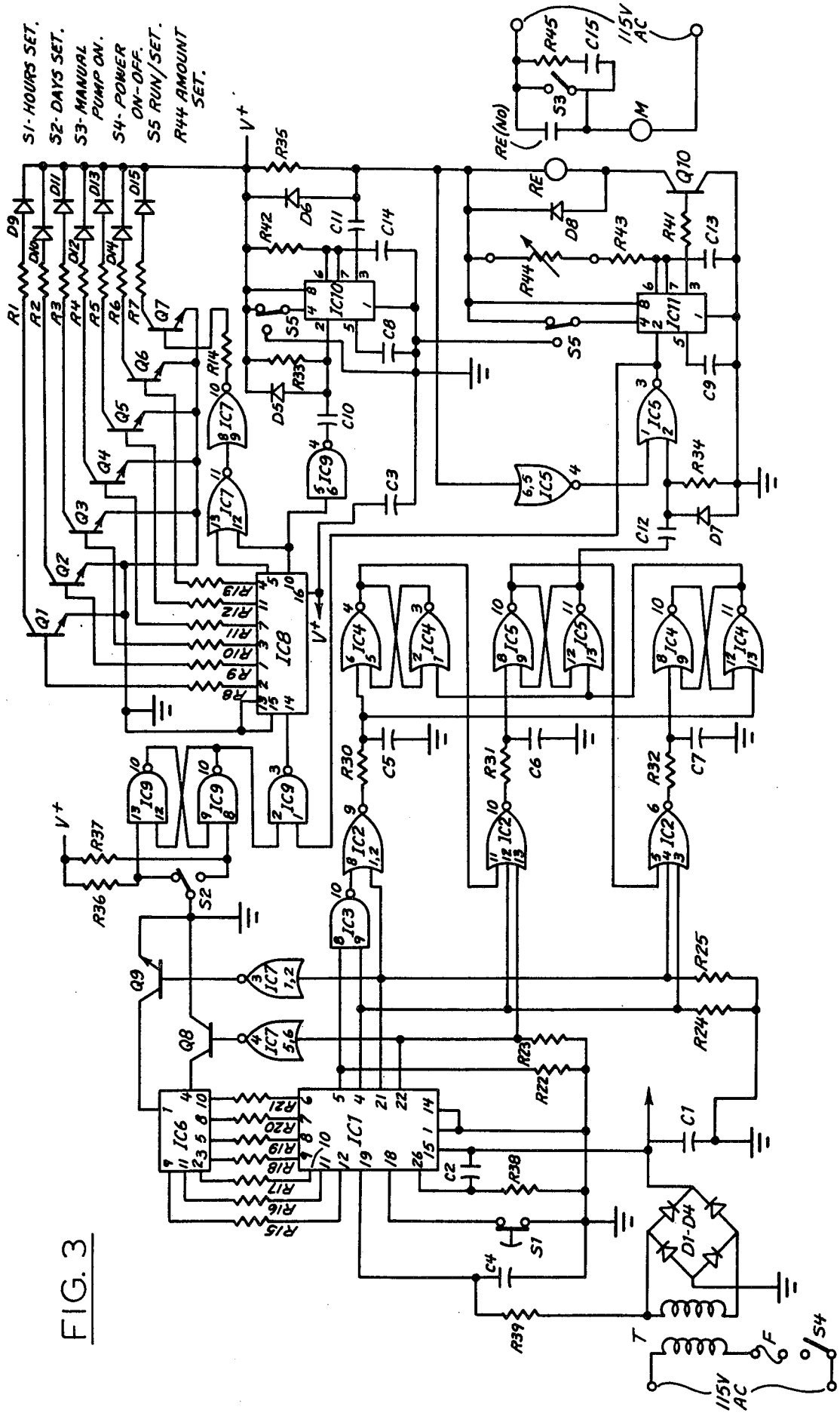
FIG. 3 is a schematic diagram of such dispensing apparatus circuitry.

The block diagram and circuitry of FIGS. 2 and 3 reveal components which can be programmed to deliver a measured amount of the treatment chemical each morning at 2 a.m. commencing with Monday as day 1 and through day 6 with twice such amount and delivered at 2 a.m. Sunday morning, day 7.

The days of the week can be displayed through provision of light emitting diodes as at 28a and the hours through a a digital display as indicated at 28b.

If an adjustment is preferred by the attendant, the days or the hours can be advanced or set back as desired.

The timer is designed to energize the motor for a pump indicated at 30 in FIG. 2 to deliver a measured amount of the treatment chemical on the basis of calibration of such pumping device 30 and its operation over a preset period of time to only deliver the measured amount of treatment chemical.

The pump timer can be set for the correct amount of treatment chemical according to the embodiment illustrated for pools ranging in size from 10,000 to 50,000 Imperial gallons.

The timer/pump unit operates on single phase 60 Hz, 120 V.A.C. and draws a current of approximately 1.5 amps. with pump 30 operating.

Although preferably the units are fitted with a three-conductor cable and plug certain installations may require the direct wiring to the electrical supply.

The power on-switch 32 mounted on front panel 14 controls power to the entire unit.

The light admitting dials 28a located across the top the top of the front panel 12 indicates the day of the week to which the timer is set. The day-set switch 34 is operable to advance the day setting of the timer by one day each time the switch is actuated. Two actuations are required to advance past day 7 or Sunday.

The hours digital display 28b is a two-digit seven segment light emitting diode which is adapted to show the hour to which the timer is set based on a 24 hour interval.

The "hour set switch" 38 is operable to advance the hour setting of the timer so long as it held in the depressed position.

The "set/run" switch 40 in the "set" position operates to disable the pump 30 so that the day set switch 34 and hour set switch 38 can be operated without the discharge of any treatment chemical, but in the "run" position the unit is operating automatically.

The "pump-on manual" switch 42 is operable to energize the pump 30 without interfering with the setting of the timer as to days and hours. Such switch is intended to be used for preliminary procedures and in the case where an additional amount of treatment chemical is required.

The pump 30 is intended to be located within the casing below panel 16 and is not illustrated, but the hose connection 44 leading to the pump and the hose connection 46 leading from the pump are both illustrated in part in FIG. 1.

In order to set up a program having regard to the apparatus and circuitry illustrated in FIGS. 1 to 3 inclusive, the following is applicable.

(1) The "power on/off" switch 32 is set to the "off" position.

(2) The "set/run" switch 4 is placed in the "set" position.

(3) The unit is then plugged into a standard 115 Volt A.C. 60 Hz power line.

(4) The "power on/off" switch 32 is then set to the "on" position.

(5) The "hour set" switch 34 is then depressed and held down until the desired time of day appears on the hour display 28b which in the preferred embodiment include 1 to 24 hours as provided by the digital clock and associated components and the switch released at the 2 a.m. setting.

(6) The "days set" switch 34 is actuated to bring the day display to the selected day of the week on the light emitting diode panels 12 by depressing once for each week day and twice for the final day which in the example is Sunday, day 7.

(7) The "amount set" switch 26 is then actuated to indicate the desired amount of treatment chemical in accordance with the known pool volume and the temperature.

(8) The "run/set" switch 40 is then actuated to the "run" position.

(9) The unit is then programmed to deliver the selected amount of treatment chemical at a time of 2 a.m.

each morning of 6 days and a double amount delivered at 2 a.m. on the final day.

If a setting other than 2 a.m. in the morning would be desired this can be readily accomplished by advancing the clock by the difference between 2 a.m. and the desired time.

For example if it were desired to introduce a measured amount of the treatment chemical at 4 a.m. each morning and if the clock were being set at 12 noon, by setting the hour to 10 would insure that the pool would be treated at 4 a.m. each morning.

A typical swimming pool installation will include an intake conduit section leading from the pool water to a circulation pump or discharge pump and from such pump to a filter and as well may include a heater in series with the return conduit section discharging back into the pool water.

It is intended that the sodium hypochlorite solution or its equivalent be fed into the return conduit section in which the fluid flow characteristics are relatively stable by drawing a measured amount from a vessel or container of such chemical through a conduit connection leading from such vessel to the pump 30 calibrated to pass under given variable conditions of the fluid flow characteristics of the discharge conduit section the precise measured amount of liquid necessary to establish a given free chlorine concentration.

Pumping devices 30 are available which are capable of withdrawing 14 oz. per minute of treatment chemical and discharging same to the recirculation flow path of the discharge conduit of a recirculation pump which discharge conduit pressure ranges ordinarily between 1 p.s.i. to 30 p.s.i.. Such pumping device 30 if energized to operate for a period of 2 minutes and 10 seconds will deliver approximately 30 fl. oz. of the treatment chemical necessary for treating the 30,000 imperial gallon pool in the example given above.

Since the layout of the conduits are ancillary to the inventive concept they have not been illustrated and need only be described.

DESCRIPTION OF THE CIRCUITRY

Clock Circuitry

With reference to FIG. 3 particularly of the drawings the digital clock 50 used in the timer is a monolithic M.O.S. integrated circuit (IC), utilizing P-Channel, low threshold enhancement mode devices. The time keeping function operates from a 60 Hz signal.

Resistor $R_{39}$ limits current to the device and capacitor $C_4$ provides protection from transients on the power line.

The outputs of the digital clock 50 are multiplexed, thus allowing the entire clock to be contained within a 28 pin D.I.L. package. The multiplex timing is set by selecting Resistor $R_{38}$ and Capacitor $C_2$ for the desired multiplex frequency. The integrated circuit I.C. incorporates both B.C.D. (Binary Coded Decimal) outputs and 7 segment outputs capable of supplying up to 5 milliamperes.

The seven segment outputs are used to directly drive two digits of a display identified in the trade by the trade mark "Litronix". Such display combined with the digits enables pins 21 and 22 of the clock chip, is used to show the hours output from clock 50. Resistors $R_{15}$ to $R_{21}$ inclusive limit current to individual segments and IC 7 with transistors $Q_8$ and $Q_9$ activate the proper digit at the proper time.

The Decoder Circuit

The BCD outputs of integrated circuit IC 1 are combined with the hours digit and enable outputs $H_{10}$ and $H_1$ to decode 1 pulse out of the clock every 24 hours.

Decoding is accomplished, using COS/MOS digital integrated circuits in the following manner. When the tens of hours reach zero, gates on $IC_2$ and $IC_3$ sense such condition and set a latch on $IC_4$. This enables a second gate on $IC_2$ and when the unit digit of the hours displayed reaches a value of 2, a second latch on $IC_5$ is set. The rising edge of this latch is differentiated by Capacitor $C_{12}$, Dila 7 and Resistor $R_{34}$ provides the pulse necessary to drive the output timer. The aforementioned latches are then reset when "Tens" of hours reach a value of 2.

Resistors $R_{30}$ to $R_{32}$ and Capacitors C5 to $C_7$ are used to delay the sensed pulses in case of overlap from the multiplexed outputs of the clock 50.

The Output Timing Network

The output timing network consists of a timer 52 connected as a monostable multivibrator. Upon application of a negative going pulse to the input of the multivibrator, the output goes high for a period set by the R/C time constant of Resistor $R_{44}$ and Capacitor $C_{13}$.

The selection of Capacator $C_{13}$ is critical to insure maximum repeatability of the timed output. Such capacitor must have good leakage characteristics due to the low currents in the R/C network. Its tolerance must also be reasonable to insure repeatability from unit to unit and thus cut down on calibration procedures during manufacture.

Switch $S_5$ allows the reset input to the timer to be grounded thus disabling the output circuitry.

The output of the timer drives a transistor $Q_{10}$ which controls the relay in the pump circuit. Resistor $R_{41}$ limits the base drive and diode $D_8$ is used to suppress transients generated by the relay coil.

Days Counting Circuitry

The output pulse from the decoder is also used to drive a COS/MOS octal 8 decoded output counter IC 8. The individual outputs from this counter are used to control transistors $Q_1$ to $Q_7$ inclusive which in turn control the light emitting diode lamps indicating the day of the week in panel 12.

Resistors $R_8$ to $R_{14}$ inclusive and $R_1$ to $R_7$ inclusive control the current in the devices. The seventh and eighth pulses are combined to drive the seventh light emitting diode lamp.

Capacitor $C_3$ decouples the power supply to this portion of the circuit.

The seventh output of the counter is also used to drive a timer 56. This timer is connected as a monostable multivibrator with an $R_{42}/C_{14}$ time constant set to 1.5 times the maximum output timing circuit time constant. The falling edge of the timed period is then differentiated by capacitor $C_{11}$, diode $D_6$ and resistor $R_{35}$ and the resulting pulse used to generate a second dosage on the seventh day. This second pulse is also fed back into the counter to provide the necessary eighth pulse.

Integrated circuit IC9, generates the manual pulses necessary to set the days. Resistors $R_{36}$, $R_{37}$ are pull up resistors required on such integrated circuits.

Power Supply

The +12 V.D.C. supply for the electronic circuitry is obtained from a conventional transformer/rectifier supply formed by transformer T 58, and diodes $D_1$ to $D_4$ inclusive and capacitor $C_1$.

Calibration

Calibration of the output timing circuit is accomplished by setting the position of the control knob on the potentiometer for the "amount set" switch 26. The scale for the "amount set" switch 26 illustrated on the front panel is laid out so that 30K (indicating pool size at normal temperatures) is directly in the center of the scale. To calibrate such unit, the potentiometer is turned to half its scale and the motor activated by running the clock past 2:00 a.m. with the "hours set" switch 38. By accurately timing the length of the operation with a stop watch and from tables established in relation to the output of pump 30, the measured amount of the treatment chemical can be established and the position of the control knob of the "amount set" switch 26 adjusted to reflect such value.

Pump Characteristics

Pump 30 is preferably a self priming pump and includes a pump housing and a driving motor. The motor runs on a standard 115 VAC and draws approximately 1.0 amps with output pressure of the order of up to 40 psi maximum.

The pump body is made of a plastic which is resistent to the activity of the sodium hypochlorite solution. Pumps of the desired character are available in the marketplace.

Pump Installation Where Pump Not Self Priming

In the use of a pump which is not self priming the vessel or tank holding the sodium hypochlorite solution should be stored at approximately the same level failing which there may be some delay in commencement of fluid flow.

Moreover such pump should have a check valve at the inlet to hold the treatment chemical in the pump housing when not in operation and an aspirator should be attached to provide for priming at start up.

In addition a check valve should also be placed in the output line near the inlet to the discharge conduit, leading from the recirculation pump whereby sufficient back pressure on the valve may be generated should the control unit and the pump be elevated in relation to the pool.

Alternative circuitry may be provided to establish a program for a cycle using time intervals of less than 24 hours. Such alternatives may be readily introduced within the framework of the disclosed dispensing apparatus, components and circuitry.

While the preferred embodiments of the improved method and dispensing apparatus have been described those persons skilled in the art may make variations, alterations or substitutions without departing from the spirit and scope of the invention as described in the appended claims.

References

The following references apply to the schematic diagram of the dispensing apparatus circuitry illustrated in FIG. 3 of the drawings.

TABLE FOR FIGS. 2 and 3

| Components | Description |
|---|---|
| $R_1 - R_7$ | 68 Kohm ¼W 5% |
| $R_8 - R_{14}$ | 100 Kohm ¼W 5% |
| $R_{15} - R_{21}$ | 3.9 Kohm ¼W 5% |
| $R_{22} - R_{29}$ | 10 Kohm ¼W 5% |
| $R_{30} - R_{32}$ | 5.6 Kohm ¼W 5% |
| $R_{33} - R_{40}$ | 100 Kohm ¼W 5% |
| $R_{41}$ | 1.8 Kohm ¼W 5% |
| $R_{42}$ | 470 Kohm ¼W 5% |
| $R_{43}$ | 68 Kohm ¼W 5% |
| $R_{44}$ | 500 Kohm ¼W 5% |
| $R_{45}$ | 220 Kohm ¼W 5% |

| Capacitors | |
|---|---|
| $C_1$ | 1000 uf 25V |
| $C_2$ | .022 uf 250V |
| $C_3$ | 4.7 uf 35V |
| $C_4 - C_{12}$ | .01 uf 250V |
| $C_{13}$ | 250 uf 50 VDC |
| $C_{14}$ | 330 uf 16V |
| $C_{15}$ | .1 uf 250 VDC |

| Diodes | |
|---|---|
| $D_1 - D_8$ | |
| $D_9 - D_{15}$ | LEDS |

| Transistors | |
|---|---|
| $Q_1 - Q_{10}$ | |

| Integrated CCTS | |
|---|---|
| IC 1 | MOS Digital Clock |
| IC 2 | Cos/Mos Triple 3 input NOR Gate |
| IC 3,9 | Cos/Mos Quad 2 input NAND Gate |
| IC 4,5,7 | Cos/mos Quad 2 input NOR Gate |
| IC 6 | 7-Segment Display |
| IC 8 | Octal 8 Decoded Outputs |
| IC 10,11 | Timer |

| Miscellaneous | |
|---|---|
| B | 7¼ × 5¼ P.C. Board |
| T | Transformer 10V C.T. |
| RE | Relay |
| $S_1$ | Momentary Contact Switch SPST (NO) |
| $S_2$ | Momentary Contact Switch SPDT (NO) |
| $S_3$ | Momentary Action Switch SPDT (NO) |
| $S_4$ | Miniature Toggle Switch SPST |
| $S_5$ | Miniature Toggle Switch SPDT |
| F | Panel MT Fuse Holder |
| TB | Terminal Block |

1. A method for maintaining a body of swimming pool water, of known volume fit for human use, comprising continuously repeating a cycle consisting of
   (a) the step of introducing into said body of water a selected amount of free chlorine yielding compound adapted to immediately raise the free chlroine concentration to a value within the established effective range of the order of between 0.5 to 10 ppm and (b) the step of recirculating said body of water for a selected timed interval measured from the commencement of said introduction step during which interval the free chlorine concentration diminishes to a point approaching the lower limit of said established effective range, (c) repeating said introduction step of said selected amount of said compound and said recirculation step for said selected timed interval successively, several times, immediately upon the elapse of the preceding timed interval of said recirculation step, (d) then immediately upon cessation of said several repeated introduction steps and recirculation steps introducing approximately twice the selected amount of said compound so as to immediately raise the free chlorine concentration substantially above said first mentioned value, and (e) finally recirculating said body of water over the same timed interval corresponding to said first mentioned timed interval measured from the commencement of the last mentioned introduction of said compound.

2. A method according to claim 1 in which said first introduction step is undertaken between sundown and dawn and the time interval of each said recirculation step is of the order of 24 hours.

3. A method according to claim 1 in which said first introduction step is undertaken between 12 midnight and 4 a.m. and each said recirculation step occupies a time interval of the order of 24 hours.

4. A method according to claim 1 in which the each said introduction step is undertaken between 12 midnight and 4 a.m. and each said recirculation step occupies a timed interval of the order of 24 hours and the several number of repetitions of said introduction step and said recirculation step five whereby a 7 day cycle is established.

* * * * *